United States Patent [19]

Behrends et al.

[11] 4,243,535

[45] Jan. 6, 1981

[54] FILTER ASSEMBLY WITH TELESCOPIC ELEMENTS

[75] Inventors: Bertwin E. Behrends, East Peoria; David A. Diebel, Metamora, both of Ill.

[73] Assignee: Caterpillar Tractor Co., Peoria, Ill.

[21] Appl. No.: 754,811

[22] Filed: Dec. 27, 1976

[51] Int. Cl.³ .............................................. B01D 29/26
[52] U.S. Cl. .................................... 210/315; 210/338; 210/499
[58] Field of Search ............... 210/314, 315, 337, 420, 210/421, 422, 409, 499, 497.1, 338; 29/163.5

[56] References Cited

U.S. PATENT DOCUMENTS

| | | | |
|---|---|---|---|
| 1,646,377 | 10/1927 | Sweetland et al. | 210/487 X |
| 1,647,799 | 11/1927 | Hammer | 210/487 X |
| 1,690,358 | 11/1928 | Babitch | 210/487 X |
| 2,448,157 | 8/1948 | Schneider | 210/487 X |
| 2,478,109 | 8/1949 | Kamrath | 210/487 X |
| 2,491,180 | 12/1949 | Horthy | 210/487 X |
| 3,016,984 | 1/1962 | Getzin | 210/497 X |
| 3,049,240 | 8/1962 | Smith | 210/487 X |
| 3,421,630 | 1/1969 | Acosta | 210/487 X |
| 3,958,634 | 5/1976 | Smith | 210/497.1 |

*Primary Examiner*—Theodore A. Granger
*Attorney, Agent, or Firm*—Phillips, Moore, Weissenberger, Lempio & Majestic

[57] ABSTRACT

A filter assembly comprises a plurality of filter elements telescopically mounted relative to each other and in a housing defining an inlet and an outlet thereon. Each filter element comprises a tubular screen having a plurality of longitudinally extending ribs secured in circumferentially spaced relationship therearound. First and second filter elements of each radially adjacent pair of filter elements have the ribs thereof aligned in abutting relationship to space the screens of the filter elements radially from each other to define a flow passage therebetween. The screen of the outermost filter element is cylindrical, the screen of the next radially adjacent filter element is frustoconically shaped and et sequence to closely compact the filter elements together. An end cap is secured on one end of the filter assembly to retain it in place in the housing.

12 Claims, 17 Drawing Figures

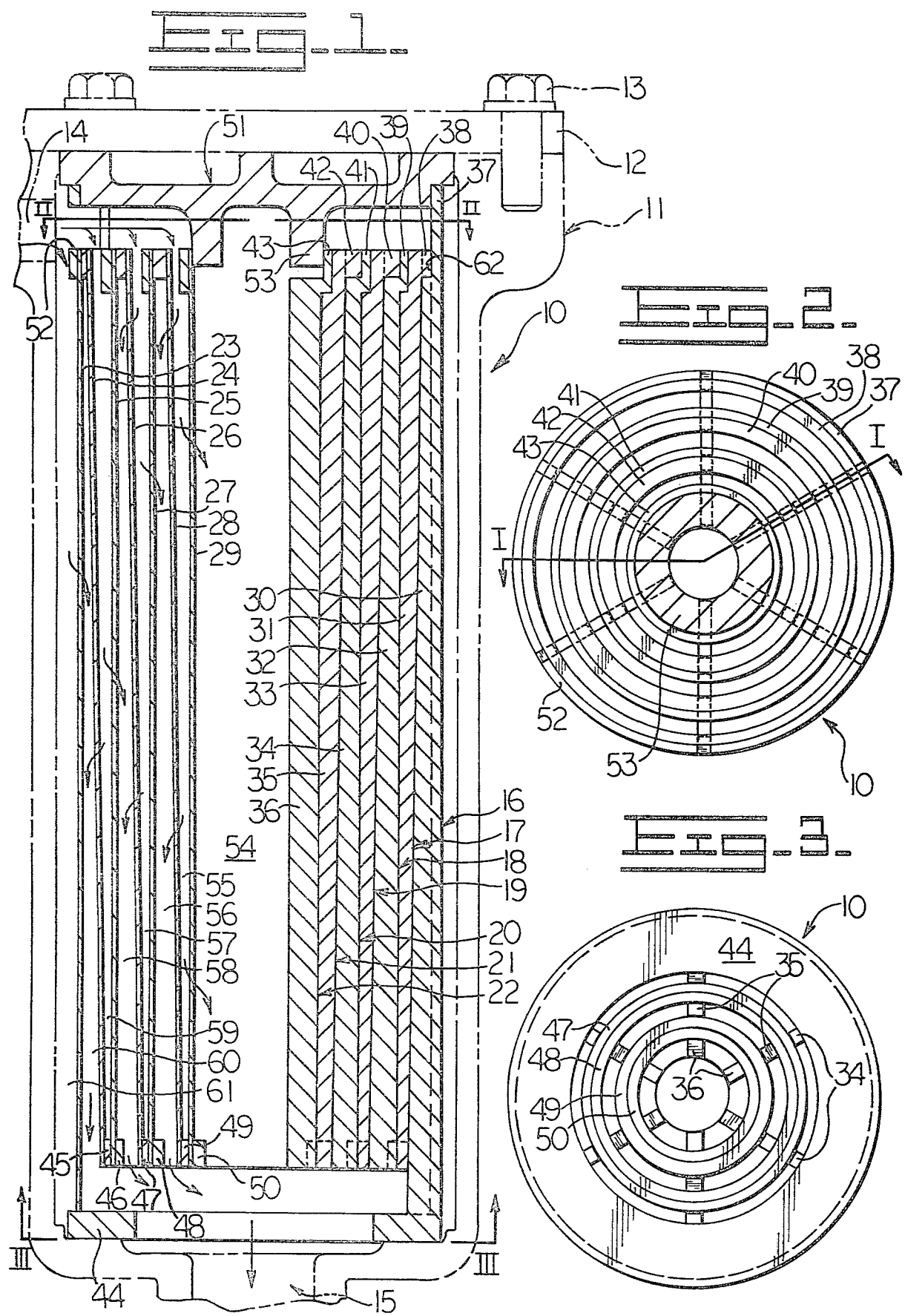

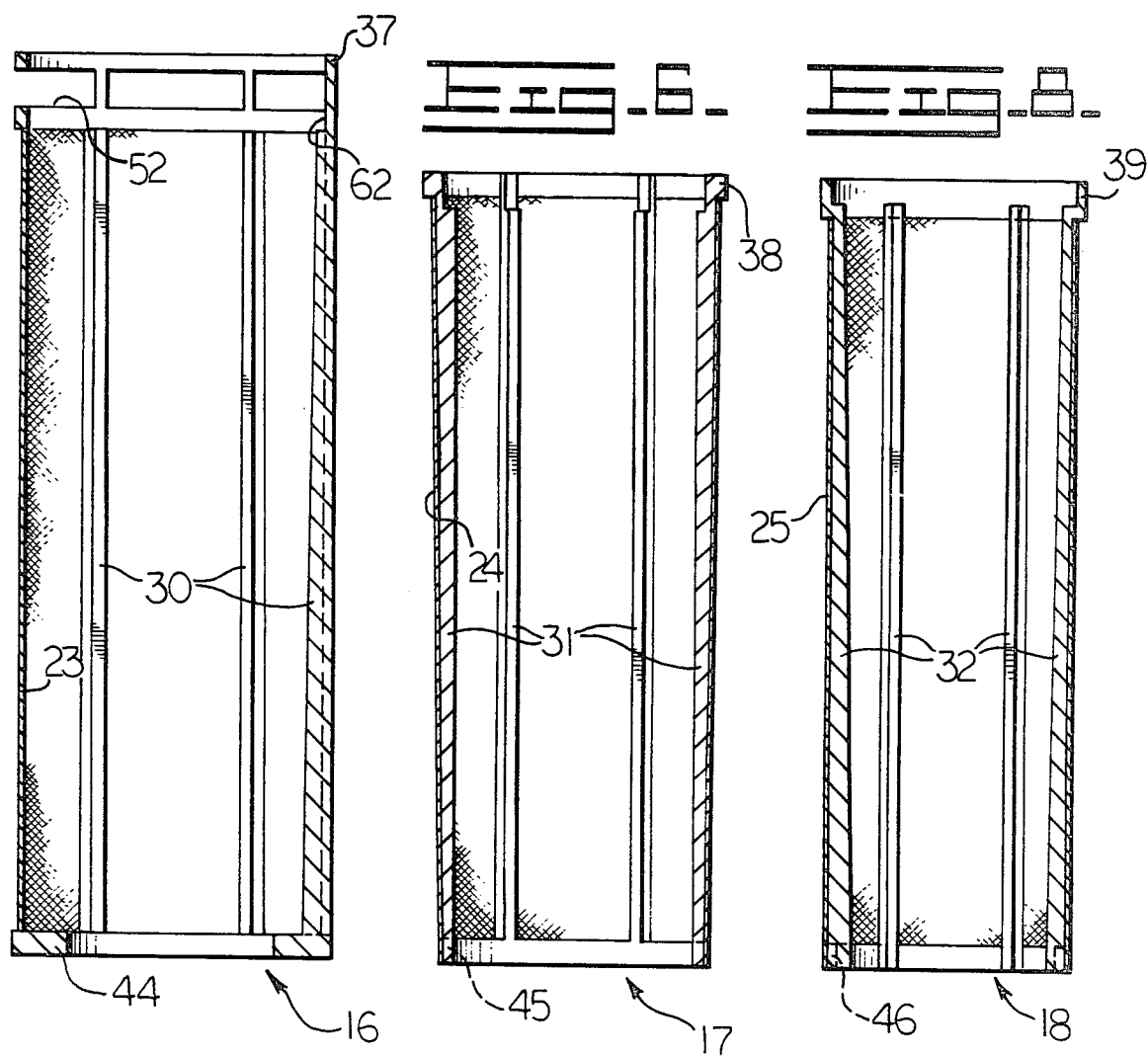

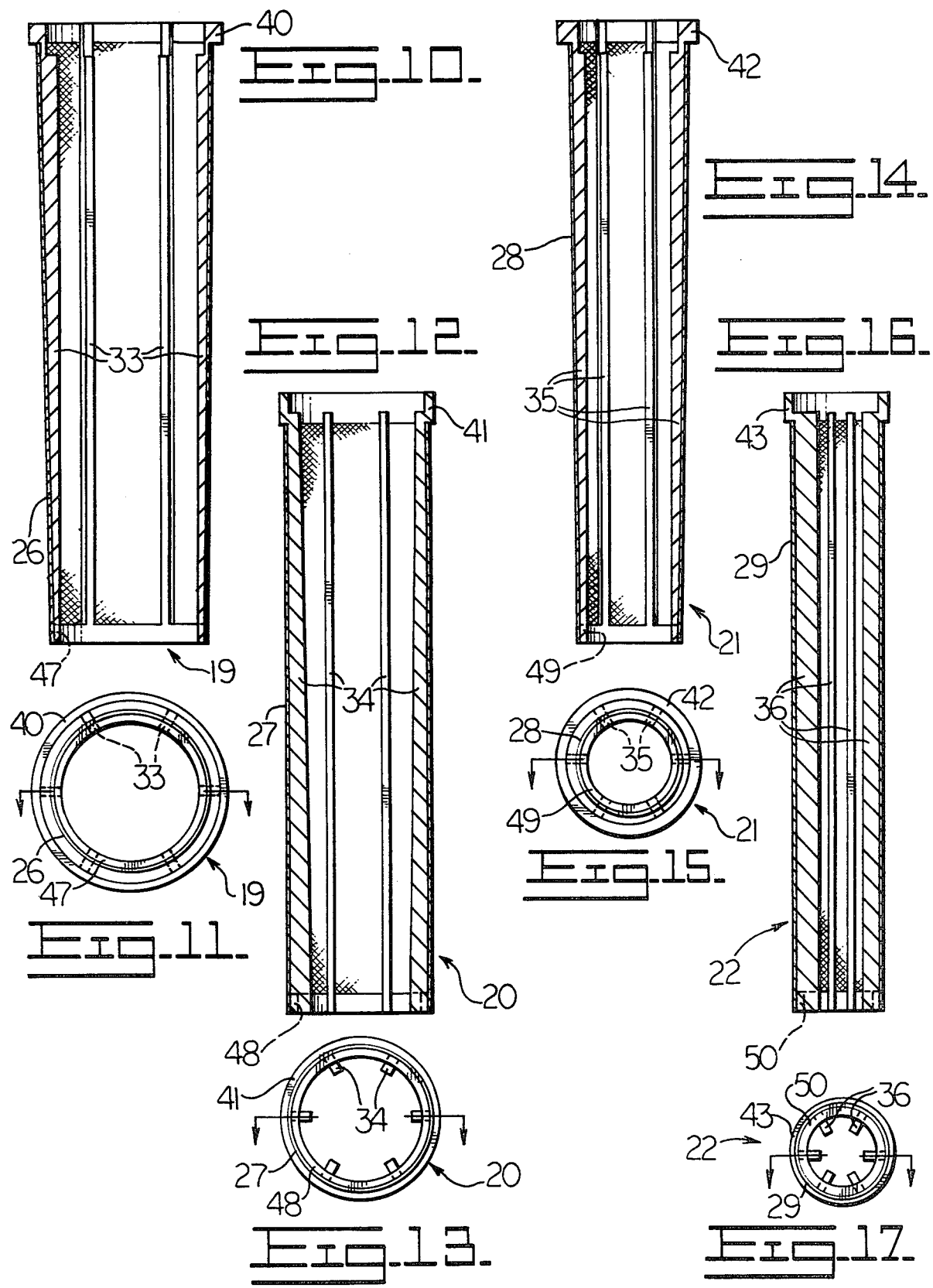

# FILTER ASSEMBLY WITH TELESCOPIC ELEMENTS

BACKGROUND OF THE INVENTION

Many types of filter assemblies have been proposed wherein a plurality of filter elements are telescopically disposed or otherwise bundled together to substantially increase the composite filtering capabilities thereof. Single-stage filter assemblies of this type normally comprise filter elements composed of a nylon screen or other suitable filtering medium formed into a cylinder or other suitable shape. The screen is normally formed by a weaving process whereby Nylon threads of various sizes are suitably woven into the desired number of threads per square inch to provide the desired micron openings for filtering purposes. In addition to manufacturing problems encountered with filtering assemblies of this type, such filter assemblies are normally quite expensive and do not provide the desired filtering area to space ratio for many filtering applications.

SUMMARY OF THIS INVENTION

An object of this invention is to provide an improved filter assembly of the above general type and a method for making the same economically. The resulting filter assembly provides a substantially large filtering area to space location ratio when compared to conventional filter assemblies.

The filter assembly of this invention comprises a plurality of telescopically disposed filter elements adapted to be mounted in a housing having an inlet and an outlet defined thereon. Each filter element comprises a tubular screen having a plurality of longitudinally extending ribs secured in circumferentially spaced relationship therearound. A first filter element of each radially adjacent pair of filter elements is telescopically disposed within a second filter element of such pair of filter elements with respective ribs of the first and second filter elements being aligned in abutting relationship with each other. The ribs thus function to space the screens radially from each other to define a flow passage therebetween communicating the inlet of the filter assembly with the outlet thereof. In the preferred embodiment of this invention, the first filter element is cylindrical whereas the second filter element is frustoconically-shaped. In addition, alternate flow passages respectively communicate with the inlet and outlet of the filter assembly to force fluid flow through the screens of the filter elements.

BRIEF DESCRIPTION OF THE DRAWINGS

Other objects of this invention will become apparent from the following description and accompanying drawings wherein:

FIG. 1 is a longitudinal sectional view of a filter assembly embodying this invention, shown mounted within a housing illustrated by phantom lines;

FIG. 2 is a cross sectional view through the filter assembly, taken in the direction of arrows II—II in FIG. 1;

FIG. 3 is a bottom plan view of the filter assembly, taken in the direction of arrows III—III in FIG. 1;

FIGS. 4 and 5 are longitudinal sectional and bottom plan views, respectively, of a first and outermost filter element of the filter assembly;

FIGS. 6 and 7 are longitudinal sectional and bottom plan views of a second filter element;

FIGS. 8 and 9 are longitudinal sectional and bottom plan views of a third filter element;

FIGS. 10 and 11 are longitudinal sectional and bottom plan views of a fourth filter element;

FIGS. 12 and 13 are longitudinal and sectional bottom plan views of a fifth filter element;

FIGS. 14 and 15 are longitudinal sectional and bottom plan views of a sixth filter element; and FIGS. 16 and 17 are longitudinal sectional and bottom plan views of a seventh and innermost filter element.

DETAILED DESCRIPTION

FIG. 1 illustrates a single-stage filter assembly 10 mounted in a tubular housing 11, shown in phantom lines. The housing may have a cover 12 detachably mounted thereon in a conventional manner by a plurality of circumferentially disposed cap screws 13. The housing defines an inlet 14 and an outlet 15 therein whereby hydraulic fluid for the transmission of a tractor, for example, will enter inlet 14, flow through filter assembly 10 and egress through outlet 15 for recirculation purposes.

FIGS. 4 and 5, 6 and 7, 8 and 9, 10 and 11, 12 and 13, 14 and 15, and 16 and 17 illustrated seven filter elements 16-22 of the filter assembly, respectively. As shown in FIG. 1, the filter elements have various diameters and are telescopically disposed relative to each other to form a composite filter assembly having a substantially large filtering area to space ratio. Filtering elements 16-22 respectively comprise fine mesh screens 23-29 having a plurality of longitudinally extending and circumferentially spaced ribs 30-36 secured thereon. In addition, upper reinforcing hoops 37-43 circumferentially surround screens 23-29, respectively, and are formed integrally with the ribs thereof. A plurality of lower hoops 44-50 are secured internally of screens 23-29, respectively, and are also formed integrally with the respective ribs thereof.

As shown in FIGS. 4 and 5, hoop 44 of outermost filter element 16 is in the form of an annular collar which seats upon housing 11 (FIG. 1) to precisely locate the filter assembly therein. Upper hoop 37 is substantially longer in a longitudinal direction than the hoops of the remaining filter elements to define an annular collar for seating an end cap 51 of the filter assembly thereon, as also shown in FIG. 1. A plurality of arcuate openings 52 are formed through hoop 37 to define a portion of inlet 14. In addition, an annular boss 53 of end cap 51 seats within a substantially cylindrical opening defined by upper hoop 43 of innermost filter element 22 and the upper portion of screen 29 thereof.

As further shown in FIGS. 4 and 5, a screen 23 of filter element 16 is cylindrical whereas the inner surface portions of each reinforcing rib 30 thereof are tapered downwardly and inwardly relative to the longitudinal axis of the filter element. In contrast thereto, screen 24 of the next adjacent filter element 17, telescopically disposed within outermost filter element 16, is frustoconically shaped and the outer surface portions of each rib 31 thereof are tapered upwardly and inwardly whereas the inner surface portions of the ribs are straight.

Screen 25 of filter element 18, telescopically disposed within filter element 17, is cylindrical whereas the outer surface portions of each rib are straight. As clearly shown in FIG. 1, such an alternate inversion of the telescopically disposed filter elements continues to innermost filter element 22 which has a cylindrical screen 29 and ribs which have straight outer surface portions. Screen 29 of the latter filter element defines a relatively large, cylindrical flow passage 54 longitudinally therethrough.

It should be further noted in FIG. 1 that a series of longitudinally disposed flow passages 55–60, each having a wedge-shaped cross section are defined between screens 23–29 and that an outermost and cylindrical flow passage 61 is defined between outermost screen 23 and housing 11. Thus, incoming fluid entering the filter assembly from inlet 14 is forced to flow into passages 55, 57, 59 and 61 and radially through the screens prior to egress into outlet 15, via alternate flow passages 54, 56, 58 and 60. Thus, this compact filter arrangement provides for a substantial filtering of the fluid through the screens and exhibits a substantial filtering area to space ratio.

Upon assembly of filter assembly 10, filter element 17 is first inserted within outermost filter element 16 with ribs 30 and 31 thereof being longitudinally and radially aligned. A suitable adhesive may be preapplied to one or both of the ribs and to hoops 37 and 38 thereof to assure their securance together. It should be further noted that an annular notch 62 is defined internally on filter element 16, between rib 30 and hoop 37 thereof, to seat hoop 38 of filter element 17 thereon.

Remaining filter elements 18–22 are thereafter telescopically disposed and secured within each other in a like manner to form the composite filter assembly. It should be particularly noted that the interlocking and securance of hoops 37–43 together greatly increases the overall structural integrity of the filter assembly. Upon securance of the filter elements together, end cap 51 may be secured thereon and the filter assembly may be installed in housing 11 upon removal of cover 12.

The embodiments of the invention in which an exclusive property or privilege is claimed are as follows:

1. A filter assembly comprising a plurality of telescopically disposed separate filter elements, each of said filter elements comprising a separate tubular screen having a plurality of longitudinally extending and uninterrupted ribs secured in a circumferentially spaced relationship therearound and wherein a first filter element of each adjacent pair of filter elements is telescopically disposed within a second filter element of said pair of filter elements with each rib of said first filter element being disposed in aligned relationship with a respective rib of said second filter element throughout the lengths thereof to space the screens of said pair of filter elements radially from each other to define a flow passage between circumferentially adjacent pairs of said ribs whereby a series of circumferentially disposed and isolated flow passages are defined throughout the length of said filter assembly, said pair of filter elements defining a first flow passage of said flow passages therebetween communicating directly with an inlet of said filter assembly disposed at a first end of said filter assembly and wherein another filter element spaced radially inwardly from said first filter element and said first filter element define a second flow passage of said flow passages therebetween communicating directly with an outlet of said filter assembly whereby fluid flow ingressing into the first flow passage of said filter assembly from said inlet will be forced through one of the filter elements of said pair of filter elements prior to its egress into said second flow passage and to said outlet.

2. The filter assembly of claim 1 wherein the second filter element of said pair of filter elements is cylindrical and the first filter element thereof is frustoconically-shaped.

3. The filter assembly of claim 2 wherein said filter assembly comprises at least two pairs of said filter elements with alternate abutting surfaces of the ribs of said filter elements being straight and tapered, respectively.

4. The filter assembly of claim 3 wherein said filter assembly comprises only three pairs of said filter elements.

5. The filter assembly of claim 1 wherein at least two of said first flow passages communicating directly with said inlet are defined in said filter assembly and wherein at least two of said second flow passages communicating directly with said outlet are defined in said filter assembly.

6. The filter assembly of claim 1 wherein each of said first and second filter elements comprises an annular hoop formed on an upper end thereof and secured integrally with the ribs thereof.

7. The filter assembly of claim 6 wherein an annular recess is formed internally on said second filter element and wherein the hoop of said first filter element is disposed in seating relationship at least substantially within said recess.

8. The filter assembly of claim 6 wherein each of said first and second filter elements further comprises a second annular hoop disposed at a lower end and internally of its screen and integrally secured to the ribs thereof.

9. The filter assembly of claim 1 wherein an outermost filter element of said filter elements has an annular collar formed on a lower end thereof adapted to be mounted on a housing and wherein the remaining filter elements each has a hoop formed on a lower end thereof and disposed in longitudinally spaced relationship relative to the collar formed on the outermost one of said filter elements.

10. The filter assembly of claim 1 further comprising an annular end cap secured on an upper end of an outermost one of said filter elements to cover the same.

11. The filter assembly of claim 10 wherein said end cap has an annular boss formed integrally thereon and disposed within an annular recess defined on an upper end of an innermost one of said filter elements.

12. A filter assembly comprising a plurality of telescopically disposed separate filter elements, each of said filter elements comprising a separate tubular screen having a plurality of longitudinally extending and uninterrupted ribs secured in a circumferentially spaced relationship therearound and wherein a first filter element of each adjacent pair of filter elements is frustoconically shaped and telescopically disposed within a second, cylindrical filter element of said pair of filter elements with each rib of said first filter element being disposed in aligned relationship with a respective rib of said second filter element throughout the lengths thereof to space the screen of said pair of filter elements radially from each other to define a flow passage between circumferentially adjacent pairs of said ribs whereby a series of circumferentially disposed and isolated flow passages are defined throughout the length of said filter assembly.

* * * * *